United States Patent Office 3,795,724
Patented Mar. 5, 1974

3,795,724
METHOD OF MAKING ALUMINA
REFRACTORY GRAIN
David E. Paul, Pleasanton, and Lloyd M. Housh, Santa
Clara, Calif., assignors to Kaiser Aluminum & Chemical Corporation, Oakland, Calif.
No Drawing. Continuation-in-part of abandoned application Ser. No. 109,065, Jan. 22, 1971. This application June 26, 1972, Ser. No. 266,411
Int. Cl. C04b 35/64
U.S. Cl. 264—65
20 Claims

ABSTRACT OF THE DISCLOSURE

A dense, high purity alumina refractory grain is made from gibbsite (aluminum trihydrate) by compacting the dry hydrate under a pressure of at least 60,000 p.s.i., and firing. Preferably, the material is subjected to shear stresses during compaction, as in a roll-type briquetting press.

CROSS REFERENCE TO RELATED APPLICATION

This application is a continuation-in-part of application Ser. No. 109,065, filed Jan. 22, 1971 and now abandoned.

BACKGROUND OF THE INVENTION

When refractory shapes are made from a plastic material, such as fireclay, which contains water of hydration that is driven off during the firing operation, it has proved feasible to form the shape from the water-containing material and fire the shape to its final form in one firing. However, even in this case it has often proved advantageous to incorporate in the refractory mix from which the shape is formed a certain amount of calcined material, for example fireclay grog, from which the water of hydration or other volatile constituent has been removed.

On the other hand, when refractory shapes or other products are to be made from nonplastic materials such as alumina or magnesite or chrome ore, it has long been the practice to form a dense grain by calcining or firing a decomposable raw material such as aluminum hydrate or magnesium carbonate. The grain so formed is crushed to carefully controlled sizes, admixed with a bonding material, formed into a brick or other shape, and then fired.

When a naturally occurring raw material such as bauxite or magnesite (MgCO$_3$) is used to make refractory grain, it is often possible to form the grain directly by firing the natural raw material, since such materials contain impurities which aid in the sintering or densification of the grain. However, when a high purity material such as synthetic magnesium hydroxide or aluminum trihydrate is used to make a high purity refractory grain, it has proved difficult to secure a grain of the desired density and low porosity without some pretreatment of the raw material prior to firing. Thus, it is known to compact refractory oxide materials and then fire them to form refractory grain.

However, if the raw material contains water of hydration or carbon dioxide, or other volatile component, compaction alone has heretofore proved inadequate to form dense refractory grain. In the first place, the compacts tend to break up during the firing operation when the water or other volatile is driven off. Even if the compacts do not disintegrate under the sometimes explosive forces during decomposition, after dehydration they are so weak that they disintegrate to a dust or powder under the mechanical abuse experienced in a rotary or shaft kiln. Not only does this prevent grain formation, it also results in large dust losses from the kiln, with consequent recovery and recycling problems. Attempts have been made to overcome the disintegration problem by using various chemical binders in the compacts, but this approach has proved either unsuccessful or uneconomic.

Even if the compacts survive the dehydration process and mechanical abuse in the kiln, it has been found that the voids left by removal of water or other volatile from the raw material do not properly heal during the firing, and the result is a low density, porous grain. This is undesirable because the use of such grain results in a weakened refractory structure in the fired shape or, if the grain sinters further during firing of the brick, in excessive firing shrinkage for the refractory shape.

To overcome these problems, it has become customary in forming a high purity refractory grain such as high purity periclase or magnesia, to practice what is known as the "double burn" process. In this process, the raw material, for example magnesium hydroxide, is calcined at a sufficiently high temperature to drive off the water of hydration. This calcined or lightly burned magnesia is then compacted, for example in a roll-type briquetting press, and fired a second time, generally to a much higher temperature. Similarly, alumina grain is made by calcining aluminum hydroxide, ball milling the calcine, nodulizing the milled calcine, and firing the nodules.

It is obvious that the double burn process is relatively expensive, and the refractories industry is searching for a simpler, less expensive method of producing refractory grain of high purity with less than ten volume percent porosity.

It will be understood that by the term "grain" is meant a relatively dense piece of refractory material of a size up to ⅜ inch or greater in average diameter. When produced, refractory grain will be of a variety of sizes ranging from the maximum given above down to very fine powder which may pass a 100 mesh screen. To use such refractory grain, for example in making refractory brick, the grain will be crushed and carefully size graded so that controlled amounts of the brick mix are made up of different size fractions ranging, for example, from grains passing a 4 mesh screen and retained on a 6 mesh screen, down through fine milled material which passes a 325 mesh screen.

SUMMARY OF THE INVENTION

It has now been discovered that a high purity alumina refractory grain can be produced directly from the gibbsite form of aluminum trihydrate (Al(OH)$_3$) in a single burning operation if the aluminum trihydrate is subjected to compaction at a pressure of at least 60,000 p.s.i. prior to firing. More specifically, the present invention is directed to a method of making dense alumina refractory grain containing at least 95% by weight Al$_2$O$_3$ comprising: (a) selecting an aluminum trihydrate of the gibbsite crystal structure containing at least 95% Al$_2$O$_3$ on the ignited basis and less than 3% by weight water removable by drying at 110° C.; (b) placing particles of said aluminum trihydrate in a confined zone; (c) applying a pressure of at least 60,000 p.s.i. to said aluminum trihydrate in said confined zone to produce compacts of high green strength having a green density at least equal to 88% of the true specific gravity of the aluminum trihydrate; and (d) firing said compacts at a temperature of at least 1650° C.

DETAILED DESCRIPTION

The raw material used in the practice of this invention is the gibbsite form of aluminum trihydrate. A material which has proved particularly amenable to the method of this invention is the gibbsite produced in the Bayer process of producing alumina for use in the production of aluminum metal. In the Bayer process, a certain amount of gibbsite is produced which is of too fine a particle size, when dried, to be fed to a rotary calcining kiln and subsequently used as feed for an aluminum reduction cell. This material, therefore, must be recycled as seed in the Bayer process. This undersize material substantially all passes a 65 mesh screen and roughly 50%, for example from 25 to 75%, passes a 325 mesh screen. However, coarser sized aluminum trihydrate, such as the normal Bayer process feed to the calcining kilns for reduction grade alumina production, can be used in this invention. The material usually has a specific surface of about 0.3 m.²/g., and comprises agglomerates of smaller crystallites. Because this fine gibbsite material is removed, in one particular Bayer plant, in the third thickener in which solids are removed from the Bayer liquor, and because it is often used as seed material in the Bayer process, it is sometimes referred to as "tertiary thickener seed" or TTS, as is set forth in more detail in U.S. Pats. 2,935,376 and 3,372,985. This tertiary thickener seed is a particularly preferred raw material for the practice of this invention. It contains, on the ignited basis, over 99 weight percent $Al_2O_3$, the principal impurity being about 0.7 weight percent $Na_2O$.

While the raw material used is referred to as aluminum trihydrate, it will be understood that material which has been heated to a temperature at which some of its water of hydration, as opposed to free water, has been driven off, can be used. Thus, it has been found that gibbsite which has been heated at a temperature and for a length of time such that it contains 15 weight percent boehmite ($Al_2O_3 \cdot H_2O$) is suitable for use in the practice of this invention. However, boehmite itself (aluminum monohydrate) when used alone does not produce the desired results.

For best results, the free water content, aside from water of hydration, of the aluminum trihydrate should be such that the material shows no more than 3% weight loss upon drying at 110° C. It will be appreciated that compacted densities of over 90% of theoretical for aluminum trihydrate, achieved by the method of this invention, could not be obtained if the material being compacted contained significant amounts of an extraneous material such as water. Stated differently, it is an advantage of this invention that, by it, hard, dense compacts are obtained without the use of tempering water or other liquid or binders. However, the aluminum hydrate used in the practice of this invention can contain minor amounts of other known additives, for example a very small percentage of magnesium stearate may be added as a mold lubricant and crystal growth inhibitor.

The dry hydrated alumina is compacted by forming into pellets under a pressure of at least 60,000 p.s.i. An apparatus particularly suited for this compaction is the well known roll-type briquetting press, widely used in the refractory and other industries. In addition to subjecting material to high compaction pressures, roll presses impart shear stresses during compaction. It is believed that this application of shear stress to the material during compaction assists in achieving the beneficial results found with the method of this invention.

It will be understood that pressure in a roll press is developed by the reaction between raw material being fed between the rolls and the rolls themselves, which are urged together by a hydraulic or other force means. While it is possible to measure directly the force applied to the roll bearings, the conversion of this to an equivalent pressure, e.g., pounds per square inch (p.s.i.), involves a determination of the area of raw material over which the force is applied. It will be appreciated that this area in a roll press is not as sharply defined as, for example, in a die-type press in which uniaxial pressure is applied, and accordingly the calculated pressure in a roll press is commonly referred to as an "equivalent" pressure. The manner of calculating this pressure for a specific set of rolls is shown in the example below.

As is common practice in operating roll presses, it will generally be found advantageous to recycle a certain fraction of the compacted material back to the roll feed so that it is subjected to a second compaction. Thus, compacts, or briquettes, coming from the roll press can be passed over a screen, for example one with square openings ⅝ inch on a side, the uncompacted material and broken compacts which fall through the screen being recycled to the roll feed. Alternatively, compacts coming from the roll press can be subjected to a crushing operation, and all the material smaller than a certain size, for example less than 4 mesh, can be recycled to the roll feed. It has been found that operation of the roll press with a feed containing 60% recycled material produces good compacts. It is believed that at least 10% recycled material is essential to obtaining good briquettes. Apparently exposure of the recycled material to further shear stresses in the roll press enhances the benefits of this invention. Alternatively, the material can be initially compacted in a smooth roll press, and then subsequently briquetted.

As is also customary in roll press compaction, the hydrate raw material can be admixed before pressing with a lubricant such as aluminum stearate or magnesium stearate. Such lubricant, as is well known, assists in the pressing operation. In addition, when a material such as magnesium stearate is used as lubricant, it decomposes upon firing to yield magnesium oxide (MgO) in the compacts and the presence of this foreign material in the alumina is believed to inhibit crystal growth of the alumina and assist in producing a grain having smaller crystallites and lower porosity.

It is sometimes advantageous to operate the roll press so that the two rolls are turning at slightly different speeds, thus increasing the shear stresses on the compacted material. It is also sometimes useful to operate the roll press with the recesses in the two rolls out of alignment so that the compacts formed are not the usual regular ellipsoid briquettes, but are more irregular in shape, and by this means also increase shearing stresses on the material.

It has been found, using the gibbsite tertiary thickener seed described above, that it is possible to produce green, unfired compacts whose green or unfired density is 93% of the theoretical density of gibbsite itself. In other words, raw compacts made according to this invention can have, in themselves, less than 10 volume percent porosity.

The green density of the unfired compacts is obtained by first weighing a compact and then determining its volume, density being weight divided by volume. The volume of the weighed compact is determined by first coating it with a layer of wax, weighing the wax-coated compact, and then determining the volume of the compact and wax coating together by water immersion. From the increase in weight of the compact due to the wax coating, and the density of the wax, the volume of the wax coating can be calculated and subtracted from the total volume to obtain the volume of the compact itself. When the material is compacted into regular geometric shapes such as right cylinders, the volume of the green compact can be determined directly from its dimensions. Determination of the green density of regular compacts by both the geometric and wax coating methods showed identical results, indicating the validity of the wax coating method.

The compacts produced in the roll press, or by other means, are fed to a kiln such as a rotary kiln or shaft kiln for firing, preferably to a temperature of at least 1650° C. The resulting fired product has a total porosity of less than 10 volume percent, often as low as 2 or 3 volume percent, and can be crushed to form sized alumina grain. Usually, the total fired porosity is less than 5 volume percent, about 4%. The $Al_2O_3$ content of the fire grain is over 99.5 weight percent, much of the Na$_2$O in the starting material being removed by volatilization during firing.

The density or porosity of the fired material is measured on crushed granules which pass a 6 mesh screen but are retained on a 10 mesh screen. The volume of a weighed amount of this material is determined by immersion in mercury. The test is conducted so that both the "closed" pores (i.e., those which cannnot be penetrated by mercury) and the "total" pores (i.e., the sum of the "closed" pores and those pores which are penetrated by mercury during the test) are determined. The weighed sample is placed in a chamber and evacuated to remove air from the pores. After evacuation, the sample is immersed in mercury under atmospheric pressure. Under these conditions, the mercury penetrates the "open" pores. Thus, the volume of mercury displaced is equal to the sum of the volume of solid material plus the volume of "closed" pores. From the weight of the sample and the true specific gravity of alumina, the actual volume of solid alumina can be determined and, by subtraction, the volume of closed pores. The sample is then removed from the mercury, a certain amount of mercury remaining in the "open" pores. The sample is reweighed, the weight gain being due to the presence of mercury in the open pores. From this weight gain, and the specific gravity of mercury, the volume of open pores is calculated. The "total porosity" is then the sum of the closed and open pores. (It should be noted that in many instances where "porosity" is reported for a material, it is closed porosity which is measured. Obviously, this is less, for any given material, than the total porosity reported for materials produced according to this invention.)

It will be understood that, in carrying out the process of this invention, materials other than aluminum trihydrate can be included in the compacted trihydrate. For example, magnesia (MgO) or magnesium hydroxide (Mg(OH)$_2$) or carbonate (MgCO$_3$) can be included with the aluminum trihydrate so as to form magnesium aluminate spinel in the fired compacts. Likewise, clay can be added to the aluminum trihydrate so as to form mullite in the fired compacts. When a nonplastic material such as magnesium hydroxide is included with the gibbsite, there must be at least 70% by weight gibbsite present, but when a plastic material such as clay is included, smaller amounts of gibbsite suffice. However, in any case the practice of this invention requires the presence of at least 50% by weight gibbsite in the material being compacted.

The fundamental novel characteristic of greatest practical importance of compacts made according to the present invention is their abrasion resistance when fired in kiln such as a rotary kiln. For example, in one test of this invention, compacts pressed at over 80,000 p.s.i. were dropped 20 feet into the feed end of a rotary kiln. The temperature at this end of the kiln was over 1100° C. Despite this severe mechanical and thermal shock, as well as mechanical tumbling within the rotary kiln, the product which emerged after firing to a peak temperature of over 1700° C. contained over 90% substantially intact briquettes. Typically, the fired product produced according to this invention consists of material about 50% of which is retained on a 4 mesh screen, and 90% of which is retained on a 10 mesh screen. In general, it may be said that the process of this invention produces a material which, after firing in a rotary kiln, is at least 80% retained on a 20 mesh screen.

The behavior can be contrasted with that of compacts pressed at 20,000 p.s.i. which, when introduced statically into a furnace at 1000° C. exploded within seconds after being placed in the furnace. Stated otherwise, when such low pressure compacts are fed to a rotary kiln, they disintegrate so that the resulting product substantially all passes through a 20 mesh screen, much of it being a powder passing a 100 mesh screen.

A second important characteristic for material to be useful as refractory grain is an adequately low fired porosity, for example less than 10 volume percent, typically less than 5 volume percent, as discussed above.

While the fundamental characteristic of product produced by this invention is its abrasion resistance in a rotary kiln, rotary kiln tests, even in the laboratory, are time consuming and require large amounts of material. Accordingly, an impact test was developed which distinguishes between compacts with adequate mechanical strength and those without. In this test, a 56 gram metal weight sharpened to a 60° point having a 0.3 mm. radius of curvature at its lower end is dropped from various heights on the ellipsoidal briquettes 1 x ⅝ x ⅜ inches heated to 1000° C. By comparison with the results of rotary kiln tests, it was determined that briquettes of adequate strength (i.e., those pressed at pressures above 60,000 p.s.i.) did not break when the weight was dropped from a height of 5 cm. or higher. On the other hand, compacts pressed at lower pressure shattered under the impact of the weight when it was dropped from heights less than 5 cm., often from as low as ½ cm.

Comparison tests run on the same materials processed in the same way confirm that the gibbsite form of aluminum trihydrate pressed at pressures above 60,000 p.s.i. has both the desired abrasion resistance in a rotary kiln and the ability to withstand the 5 cm. drop in the impact test.

While the impact test gives a good quantitative measure of the strength of green briquettes, for quality control in a plant, or for a very large series of tests, a simpler test is desired. For this reason, the green or unfired density of the briquettes is measured as described above. Cross comparisons between the impact test and actual rotary kiln tests show that compacts of gibbsite which pass both the rotary kiln and impact tests have a green density of at least 2.12 g./cc. From the true specific gravity of gibbsite, it can be calculated that these compacts are at least 88% by volume solid material or, alternately stated, that the volume of voids in the green compacts is not over 12%. It will be recognized by those skilled in the art that this degree of compaction is exceedingly unusual, normal compaction of solid materials being in the order of 50–60 volume percent solid. Green densities of gibbsite compacts as high as 2.27 g./cc. (i.e., 94% of the volume filled with solid material) have been obtained.

In summary, aluminum trihydrate compacts pressed at over 60,000 p.s.i. according to the process of this invention have the following characteristics: (1) a green density of at least 2.12 g./cc.; (2) the ability in the 1 x ⅝ x ⅜ inch size to withstand, when heated to 1000° C., the impact of a sharpened 56 gram weight dropped from 5 cm. or higher; and (3) the ability to be dropped into a rotary kiln at a temperature of over 1000° C. and emerge from that kiln after firing to temperatures above 1650° C. sufficiently intact so that at least 80% of the material is retained on a 20 mesh screen.

While the fundamental reasons for the success of the present invention are not completely understood, and it is not intended to be bound by any theory, it is believed that compaction of the gibbsite, particularly the shear stresses involved in roll pressing, break down the agglomerates of small crystallites and move them closer together. It is also believed that compaction affects the mechanics of thermal decomposition of gibbsite. It is well known that gibbsite can decompose in different ways depending on the decomposition conditions. For example, gibbsite can decompose at about 190° C. to the boehmite form of aluminum monohydrate, this latter decomposing at successively higher temperatures to the gamma, delta, and theta forms of alumina, and eventually to alpha alumina or corundum (Al$_2$O$_3$). On the other hand, it is also possible for gibbsite to decompose at about 250° C. to the chi form of alumina, this latter at higher temperatures passing through the kappa phase and eventually becoming alpha alumina or corundum.

When the tertiary thickener seed described above is decomposed in its uncompacted form, differential thermal analysis, thermogravimetric analysis, and X-ray diffraction indicate that about 20% of the material passes through the boehmite path of decomposition, the other 80% passing through the chi path. On the other hand, when briquettes of gibbsite compacted according to this invention are subjected to the same analysis, it appears that at least 99% of the material decomposes by the chi path.

The principal advantage of the method of this invention is that, by it, there are produced compacts of aluminum hydrate which are strong enough to resist the disruptive forces of dehydration during firing and also strong enough to resist the mechanical abuse of passing through a rotary or other kiln, the resulting product being coherent, dense, low porosity sintered compacts suitable for use, either directly or after crushing and sizing, as high purity alumina grain.

EXAMPLE

Tertiary thickener seed as described above was dried to a water content of less than 0.5 weight percent and 50 pounds of this material admixed with one-half weight percent magnesium stearate in a dry mixer. Because the amount of material used was not sufficient to run the roll press continuously, the effect of recirculation of the compacted material was achieved by compacting half the material between smooth rolls 12 inches in diameter by 2 inches wide at a roll separating force of 37 tons, granulating this compacted material so that it all passed a 4 mesh screen, and admixing the precompacted material with the remaining raw material. This mixture, at a temperature of 90° C., was fed to briquetting rolls at a roll separating force of 27 tons. These rolls were 12 inches in diameter and 2 inches wide, their surfaces containing recesses 1 inch wide by 5/8 inch long and 3/16 inch deep, whereby the rolls formed ellipsoidal briquettes about 1 x 5/8 x 3/8 inches.

The roll separating force of 37 tons corresponds to an equivalent force of 18.5 tons per linear inch of roll length. It will be understood that, for smooth cylindrical rolls, it is essentially impossible to determine the area of compaction between the rolls, and hence not possible to convert the rolls separating force to an equivalent pressure. The 27 ton roll separating force corresponds to 36.5 tons per square inch (t.s.i.) briquetting pressure. With briquetting rolls, the cross sectional area of the pockets formed by the two rolls at the line of closest contact can be used to calculate an equivalent pressure.

The cross-sectional area of a single briquette pocket is calculated by considering it to be elliptical and using the usual formula for the area of an ellipse, $A = \pi ab$, where $a$ and $b$ are the semimajor and semiminor axes of the ellipse. Using the dimensions given above, the cross-sectional area of a single pocket is calculated to be 0.492 square inch. The cross-sectional area of a single briquette pocket is multiplied by a geometrical factor which depends on the number of pockets across the width of the rolls. For the 2" rolls used in the example, which have two staggered rows of pockets, the geometrical factor is 1.5. Thus, the total area on which the 27 ton roll separating force is applied is determined to be 0.74 square inch, giving an equivalent pressure of 36.5 tons per square inch, or 73,000 p.s.i.

The resulting green (i.e., unfired) briquettes produced had a density of 2.25 g./cc., 93% of the theoretical density of gibbsite. These briquettes were sintered at 1800° C. with a one hour soak. They remained coherent during passage through a rotary kiln, and had a fired porosity of 2.7 volume percent. The $Al_2O_3$ crystallites in the grain averaged 30 microns in size. The grain analyzed over 99% $Al_2O_3$ and about 0.1% each of $Na_2O$, MgO, $Fe_2O_3$ and $K_2O$. In other words, sodium was driven off during the firing.

By way of comparison, when the same tertiary thickener seed was dried and compacted into right cylinders in a uniaxial press at a pressure of 10 tons per square inch, and an attempt made to fire these compacts, they disintegrated during firing. In other words, these low pressure compacts had insufficient strength to pass through a rotary kiln. Similarly negative results were obtained with compacts of the same material isostatically pressed at pressures below 60,000 p.s.i.

The results of the preceding example can also be compared with briquettes of the same material compacted in a roll press at 15,000 p.s.i. These briquettes showed a green density of only 1.90 g./cc., and when subjected to the impact test described above, shattered when the weight was dropped from a height of only one-half centimeter. When fired in a rotary kiln, such low pressure briquettes completely disintegrated, the material which emerged being all finer than 20 mesh.

Likewise, the use of various chemical binders in the low pressure compacts in an attempt to impart strength to them so that they would pass through the firing operation without disintegration proved completely unsuccessful.

Finally, the results obtained with gibbsite in the example can be compared with those obtained using bayerite, another crystalline form of aluminum trihydrate. The bayerite was sized so that 100% passed a 65 mesh screen and 75% was retained on a 325 mesh screen. It was compacted in the same type of rolls used in the example, using 20% minus 4 mesh recycled material, but at an equivalent pressure of 50 tons per square inch, to form briquettes 1 x 5/8 x 3/8 inches. The green density of the unfired bayerite briquettes was only 78% of the true specific gravity or theoretical density of bayerite itself, and the compacts shattered in the 1000° C. impact test when the 56 g. pointed weight was dropped from a height of only 1 cm. The total porosity of the briquettes after static firing at 1800° C. for 1 hour was 7.2 volume percent.

While again not wishing to be bound by any theory, the results with bayerite suggest that the unexpected results obtained with gibbsite may be related to the particular crystal structure of that material.

In summary, the high pressure compaction of this invention has proved to be the only method so far discovered by which aluminum hydrate can be fired directly to a dense coherent alumina grain in a single firing operation.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw-Hill Book Company, at p. 963. For example, a 100 mesh screen opening corresponds to 147 microns, and 200 mesh to 74 microns. Analyses of mineral components are reported in the usual manner, expressed as simple oxides, e.g., MgO, $SiO_2$, although the components may actually be present in various combinations, e.g., as a magnesium silicate.

Having described the invention, what is claimed is:

1. Method of making dense alumina refractory grain comprising:

(a) selecting a particulate material at least 85% by weight of which is aluminum trihydrate of the gibbsite crystal structure and which contains at least 95% by weight $Al_2O_3$ on the ignited basis and less than 3% by weight water removable by drying at 110° C., at least 10% of the particulate material having already been subjected to compaction;

(b) placing said particulate material in a roll-type briquetting press;

(c) applying a pressure of at least 60,000 p.s.i. to said particulate material in said briquetting press to produce compacts of high green strength having a green density at least equal to 88% of the theoretical density of the aluminum trihydrate; and (d) firing said compacts at a temperature of at least 1650° C. to produce an alumina refractory grain containing at least 95% by weight $Al_2O_3$ with a total porosity of less than 10 volume percent, and of such a size that at least 80% by weight of the material is retained on a 20 mesh screen.

2. Method according to claim 1 wherein the particulate material is the undersized product from a Bayer process, substantially all of which passes a 65 mesh-screen.

3. Method according to claim 1 wherein the particulate material contains over 99% $Al_2O_3$ on the ignited basis.

4. Method according to claim 1 wherein the firing is carried out in a rotary kiln.

5. Method according to claim 1 wherein the firing is carried out at a temperature of at least 1800° C.

6. Method according to claim 1 wherein the grain has a total porosity of less than 5 volume percent.

7. Method according to claim 3 wherein the particulate material is the undersized product from a Bayer process, substantially all of which passes a 65 mesh screen.

8. Method according to claim 3 wherein the firing is carried out in a rotary kiln.

9. Method according to claim 3 wherein the firing is carried out at a temperature of at least 1800° C.

10. Method according to claim 3 wherein the grain has a total porosity of 5 volume percent.

11. Method according to claim 10 wherein the firing is carried out in a rotary kiln.

12. Method according to claim 10 wherein the firing is carried out at a temperature of at least 1800° C.

13. Method according to claim 10 wherein the particulate material is the undersized product from a Bayer process, substantially all of which passes a 65 mesh screen.

14. Method according to claim 11 wherein the particulate material is the undersized product from a Bayer process, substantially all of which passes a 65 mesh screen.

15. Method according to claim 11 wherein the firing is carried out at a temperature of at least 1800° C.

16. Method according to claim 15 wherein the particulate material is the undersized product from a Bayer process, substantially all of which passes a 65 mesh screen.

17. Method according to claim 6 wherein the particulate material is the undersized product from a Bayer process, substantially all of which passes a 65 mesh screen.

18. Method according to claim 4 wherein the particulate material is the undersized product from a Bayer process, substantially all of which passes a 65 mesh screen.

19. Method according to claim 6 wherein the firing is carried out in a rotary kiln.

20. Method according to claim 6 wherein the firing is carried out at a temperature of at least 1800° C.

References Cited

UNITED STATES PATENTS

| 2,729,855 | 1/1956 | Titus et al. | 264—109 |
| 3,378,615 | 4/1968 | Zisner | 106—58 |
| 3,414,643 | 12/1968 | Collie | 264—109 |

FOREIGN PATENTS

| 373,478 | 3/1937 | Canada | 264—66 |

OTHER REFERENCES

J. E. Browning, "Agglomeration," Dec. 4, 1967, Chemical Engineering at 147 and 154–157.

G. D. Kelly, "Effects of Hydrostatic Forming," June, 1961, Ceramic Bulletin, at 378–382.

R. M. Fulrath et al., Ceramic Microstructures, 1968, John Wiley & Sons, Inc., New York, pp. 940–942.

DONALD J. ARNOLD, Primary Examiner

U.S. Cl. X.R.

106—65; 264—56, 117